United States Patent
Hartnett et al.

[11] 3,905,772
[45] Sept. 16, 1975

[54] APPARATUS FOR PERFORMING BLOOD TYPING TESTS

[75] Inventors: John J. Hartnett, Yonkers; Jules Barry Cohen, Brooklyn; Emil A. Scordato, Bronxville, all of N.Y.

[73] Assignee: Medical Laboratory Automation, Inc., Mount Vernon, N.Y.

[22] Filed: July 5, 1973

[21] Appl. No.: 376,590

[52] U.S. Cl.............. 23/259; 23/230 B; 23/253 R; 23/292; 211/74; 233/26
[51] Int. Cl.² .................. B01L 3/14; G01N 31/00; G01N 33/16
[58] Field of Search...... 23/253 R, 230 B, 259, 292; 211/74; 233/26

[56] References Cited
UNITED STATES PATENTS

| | | | |
|---|---|---|---|
| 3,605,829 | 9/1971 | Genese et al. ................ | 141/79 |
| 3,707,354 | 12/1972 | Goodman...................... | 23/253 R |
| 3,713,771 | 1/1973 | Taylor et al.................. | 23/253 R X |
| 3,713,775 | 1/1973 | Schmitz....................... | 23/253 R |
| 3,785,773 | 1/1974 | Rohrbaugh.................... | 23/253 R |

*Primary Examiner*—Joseph Scovronek
*Assistant Examiner*—Barry I. Hollander
*Attorney, Agent, or Firm*—William P. Keegan

[57] ABSTRACT

A plurality of test tubes formed as an integral unit together with a member that is marked with indicia for reagents to be mixed in the tubes in performing tests to determine blood type groups. A testing rack is also disclosed for accommodating a plurality of test tube units and indicia members.

12 Claims, 11 Drawing Figures

APPARATUS FOR PERFORMING BLOOD TYPING TESTS

This invention relates to an apparatus for use in performing tests to determine the blood type of a donor or patient according to the ABO classification system.

In our knowledge of blood physiology we know that the differences between the red blood cells of individuals lie in the chemical structures on the cell surfaces. These structures are called blood group antigens and are the result of inherited genes. We are also aware that the body produces antibodies which attack and destroy substances foreign to the host body. This is the underlying factor in the immunological reactions carried on in the human body. In fact the production of an antibody is stimulated by the introduction of the foreign substance. Foreign substances which stimulate the production of antibodies are termed antigens, and blood group antigens lead to the production of antibodies that will destroy the antigens and the red cells of which they are a part.

Inasmuch, as noted above, as the red blood cells of different individuals have different antigens, it is clear that if, in transfusing blood to a patient, the transfused donor's red blood cells had antigens different than those of the patient, the introduction of the donor's blood into the patient's blood stream would immediately stimulate the production of antibodies that would destroy the transfused blood and thereby vitiate the effects which it was desired to give the patient by the transfusion. It needs no emphasis to say that the consequences could be dire. On the other hand, if the red blood cells of the donor and the patient each had the same antigens, blood could be transfused from one to the other without any untoward incidents.

The foregoing is very well known, and it has led to a blood classification system based on the presence of the known blood group antigens. The principal blood group antigens are designated A and B, with some red cells having A antigens, some having B antigens, some having both A and B antigens, and some having neither antigen. These blood groups are designated, respectively, Type A, Type B, Type AB, and Type O. There are other genetic factors which have to be taken into account, but in general the foregoing blood group types offer a satisfactory preliminary categorization to help insure safe blood transfusions.

There is one other antigen that is significant and the presence or absence of which must be determined, and that is the Rh antigen. As are the other antigens referred to, it is an important factor in blood transfusions, but it is especially important in pregnancy where an Rh negative mother who developed Rh antibodies during a previous pregnancy may transfer those antibodies to a fetus having Rh positive blood with possibly fatal results to the fetus or to the baby shortly after birth.

Thus it is clear that the classification of a person's blood type must be done in a manner that minimizes, if not eliminates, the possibility of wrongful classification. This is especially true under laboratory conditions where blood from a number of individuals may be undergoing simultaneous grouping.

In performing a blood grouping test, it is usual to test an individual's blood cells for the presence of antigens, and, as a confirmation, the blood serum or plasma for the presence of antibodies. Obviously, a multiplicity of sample-containing test tubes must be used for the tests on an individual's blood. In a busy hospital laboratory where numerous blood specimens are being typed simultaneously, the typing function involves many pipettings, centrifugations, and agglutination observations that involve blood, serum, and reagents for each patient specimen. Unless the utmost care is exercised at all times there is the danger that a test tube and contents associated with one individual will be interchanged with that of another. Even with the exercise of care, there is always the possibility of an inadvertent mix-up of test tubes and contents being tested.

It accordingly is an object of this invention to provide an improved blood group testing apparatus.

It is another object of this invention to provide a blood group testing apparatus that minimizes the chance of interchanging individual test tubes between two groups of test tubes undergoing testing.

It is still another object of the invention to provide a blood group testing apparatus that minimizes the possibility of introducing the wrong reagent to a sample being tested.

It is yet another object of the invention to provide a blood group testing apparatus that enables a technician to readily observe which reagent causes agglutination when that reaction occurs.

It is another object of the invention to reduce the time and tedium in performing blood grouping tests by eliminating the need to label test tubes and to reduce the number of items to be handled.

In carrying out the invention there is provided a unitary assembly of test tubes comprising a number of tubes sufficient to accommodate the number of samples of a person's blood cells and serum or plasma used in making the number of tests needed to determine a blood grouping type, or to make other conventional blood tests. Moreover, the invention embodies a carrier member that can be joined to the assembly of test tubes, which carrier is so marked with indicia that each test tube is associated with a reagent indicia that indicates the reagent to be added to that test tube. Preferably, the carrier is a re-usable item and the test tube assembly is a single-use disposable unit. A special test tube rack is also provided having a plurality of testing stations each of which can accommodate a test tube assembly and carrier, as well as a blood tube and a serum tube for containing blood cells and serum that will be pipetted into the appropriate tubes of the test tube assembly. Each testing station can accommodate a number of individual test tubes in which additional cell or serum samples can be tested for other than blood group typing. The testing stations are each arranged in a group so that they may be readily distinguished from one another, and the test tubes containing samples from one blood donor or patient thus separately grouped so as to avoid mingling or inadvertent interchange with those of another donor or patient. Included in the invention is a special centrifuge head that can accommodate the test tube assembly and carrier hereinabove mentioned. Thus during all stages of a blood grouping test, the test tubes containing samples of an individual's blood constituents are handled as a unit, thereby minimizing the possibility of confusing individual test tubes and tests of one person's blood for those of another.

Features and advantages of the invention may be gained from the foregoing and from the description of a preferred embodiment of the invention which follows.

Figure 1:
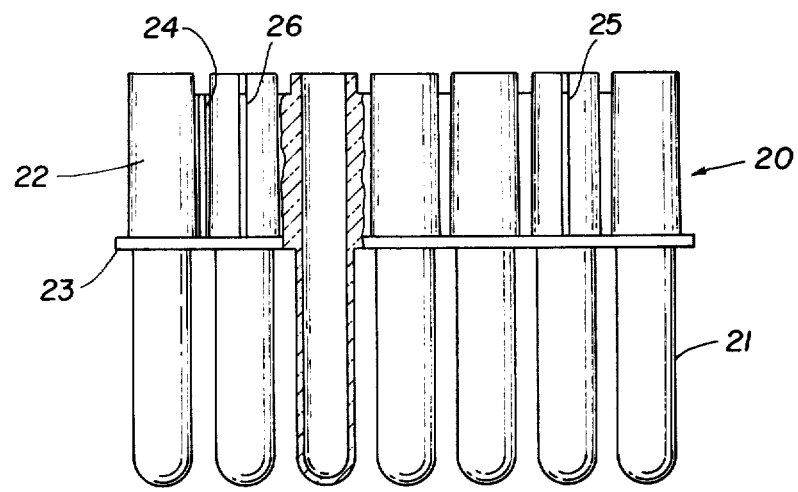
FIG. 1 is a front elevational view showing a test tube unit.
Figure 2:
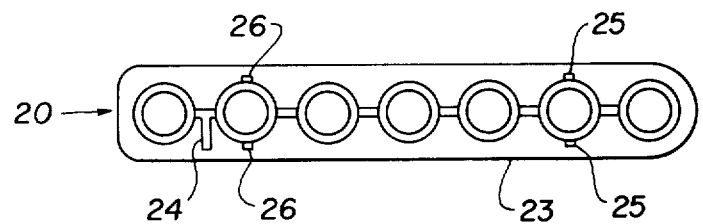
FIG. 2 is a top plan view of the test tube unit of FIG. 1.

Reference is now made to FIGS. 1 and 2 of the drawing which specifically show the test tube unit 20 according to the present invention. The unit 20 is preferably molded as a single piece with the desired number of test tubes formed directly in the unit. In the embodiment shown, seven test tubes are illustrated, this being a sufficient number for performing the usual tests to type a blood specimen. Of course, if a different laboratory procedure was being performed that required a different number of tests to be grouped together, unit 20 would be formed with a different appropriate number of test tubes. The individual test tubes 21 of the unit are joined together by what may be termed a collar element 22 that is provided with a bottom ledge 23 which in addition to a purpose that will be mentioned hereinafter, serves to hold the test tubes 21 of unit 20 in a linear configuration. It will be observed that one end of ledge 23 is rounded while the other end is of a rectangular shape. The reason for this will be apparent as the description progresses but it can be stated now that this arrangement provided convenient means for giving unit 20 a directional orientation. Rib 24 serves to prevent a carrier from being placed over unit 20 in a reversed direction, and ribs 25 and 26 serve to frictionally engage the inside surface of the carrier. The assembly of the carrier and unit 20 will be later described.

Figure 3:
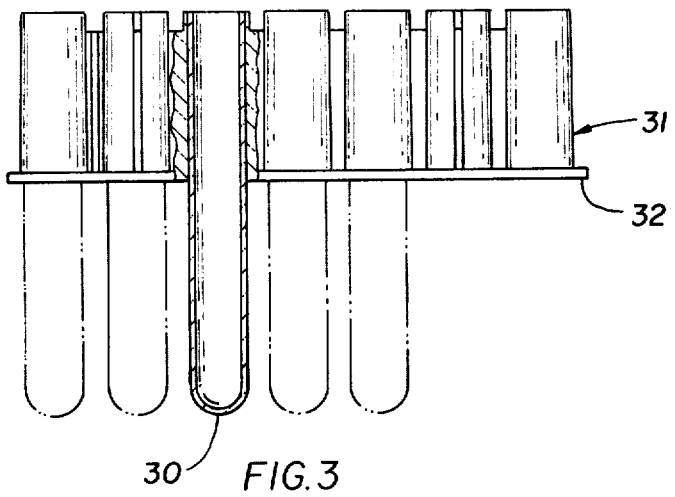
FIG. 3 is a front elevational view of a holder for a plurality of test tubes that may be used in a different embodiment of the test tube unit.

FIG. 3 discloses a different embodiment of a test tube unit. In this particular embodiment the test tubes 30, shown in dotted outline to indicate that they are separate items, are fitted into plastic collar 31. Collar 31 has the same general configuration as the similar portion of unit 20 except that it is provided, in the example illustrated, with seven openings through which seven test tubes can be inserted. The test tubes may be of glass or a plastic material, but they will be held firmly by collar 31. When test tubes 30 are inserted in collar 31, the assembly has the same attributes as unit 20 of the FIGS. 1 and 2 embodiment. Thus the assembly has a directional orientation because collar 31 is provided with a ledge 32 having one rectangular end and one rounded end, the same as the similar parts of collar element 22 of unit 20. Collar 31 is also provided with ribs similar to ribs 24, 25, and 26, but these have not been given reference numerals in FIG. 3.

Figure 4:
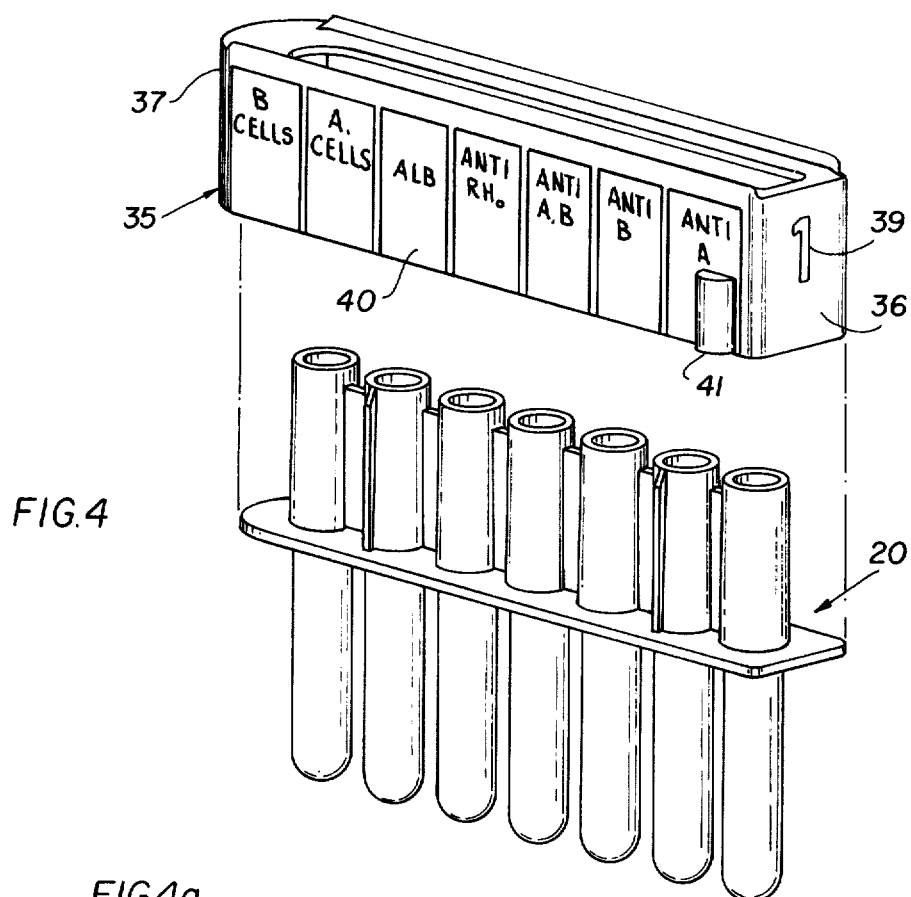
FIG. 4 is a perspective view of a test tube unit carrier.
Figure 4A:
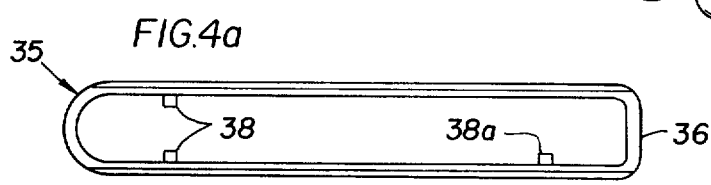
FIG. 4a is a top plan view of the test tube unit carrier.
Figure 5:
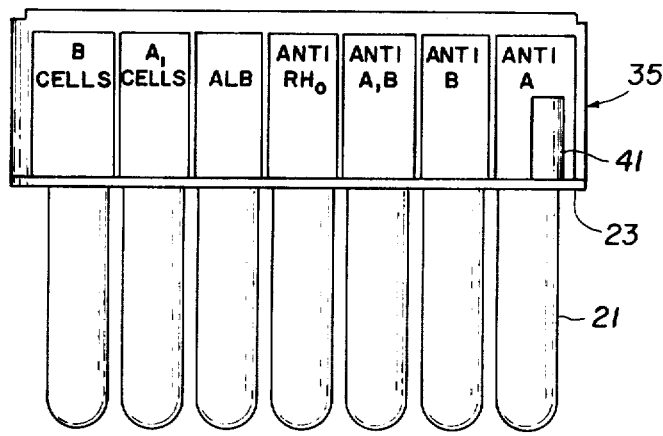
FIG. 5 is a front elevational view showing a carrier joined to a test tube unit.

The test tube carrier 35 is illustrated in FIGS. 4 and 4a and is seen to be an elongated, four-walled member without a top or a bottom surface, but having a square end 36 and a rounded end 37 corresponding to the similarly shaped ends of ledge 23 of unit 20. In use, carrier 35 will fit snugly, but removably, around the collar part 22 of unit 20, the snug fit being effected by the engagement of ribs 25 and 26 with the interior surface of the carrier. To avoid undue repetition, only unit 20 will be mentioned hereinafter, but when it is, it is to be understood that the assembly of FIG. 3 could just as well be used. When carrier 35 is placed on unit 20 it will be located by engagement with ledge 23. Also, it can only be placed on unit 20 in one direction since protuberances 38 and 38a formed on the inner surface of carrier 35 would otherwise interfere with rib 24. Carrier 35 must be placed on unit 20 so that rib 24 of unit 20 will be located in the part of carrier 35 devoid of a protuberance 38 or 38a. Other arrangements could be provided to prevent carrier 35 being placed on unit 20 in a reversed direction.

Carrier 35 is provided with labels bearing markings or indicia appropriate to blood typing tests to be performed in the test tube unit 20 herein described. Thus sidewall 40 of carrier 35 will be divided into seven areas as shown, each area corresponding to a test tube 21 in unit 20, now carried or surrounded by carrier 35. Labels pasted in the seven areas will be printed with the legends: B Cells; A Cells; A1b; Anti Rh$_o$; Anti A, B; Anti B; and Anti A. These legends correspond to the reagents that are used in blood typing tests and they are well known to those technicians who carry out blood typing tests. Of course other legends could be used, or carrier 35 could be printed with permanent markings or legends. However, labels are preferred since they enable each laboratory to customize the carrier according to its individual practice.

The front wall of carrier 35, i.e., end wall 36, also is marked with a numeral 39 that corresponds to a test station position in a rack later to be described. In the illustration, the numeral so marked is the number "1". The same end wall of other carriers, ten in all are contemplated for use with a 10 station test rack, are marked with the numbers 2, 3, 4, 5, 6, 7, 8, 9, and 10, respectively. As will be explained hereinafter when the test rack is described, the 10 test stations of the rack will be marked similarly with the numbers 1 to 10. A rack with more than ten test stations could be provided in which case the additional test stations will be marked with progressively higher numbers and a correspondingly larger quantity of carriers 35 provided. The additional carriers will, of course, be suitably marked with numbers corresponding to the additional test stations. Instead of a longer rack having more than, for example, 10 stations, a second ten station rack could be provided with the test stations marked with the numbers 11 to 20, and the two racks simply placed alongside one another. With the numeral markings on both the test rack and the carriers 35, a carrier and its associated test tube unit 20 could be removed from its test station in the rack and replaced after being used in some step of the blood typing procedure with little liklihood of being misplaced. A mechanical keying scheme could be employed as by providing a key 41 on carrier 35. A carrier for each test station would have its key located in a different position on the carrier and this would correspond to a key slot similarly placed in the test rack. This will be referred to again when the test rack is considered. It is generally believed, however, that the numeral markings are sufficient to insure that a test tube unit 20 and associated carrier 35 will not be placed in the wrong test station and that a mechanical keying scheme is not essential to the utility of the apparatus. In the event a keying scheme is used, to standardize on the manufacture of carrier 35, the bottom edge of the carrier could be formed with a plurality of slots or apertures (not shown) and a separate key element, similar to key 41 but having a stem for insertion into a selected slot or aperture, could be provided. The keys or key elements can be provided on both sides of carrier 35, or along one side of the carrier only.

Figure 6:
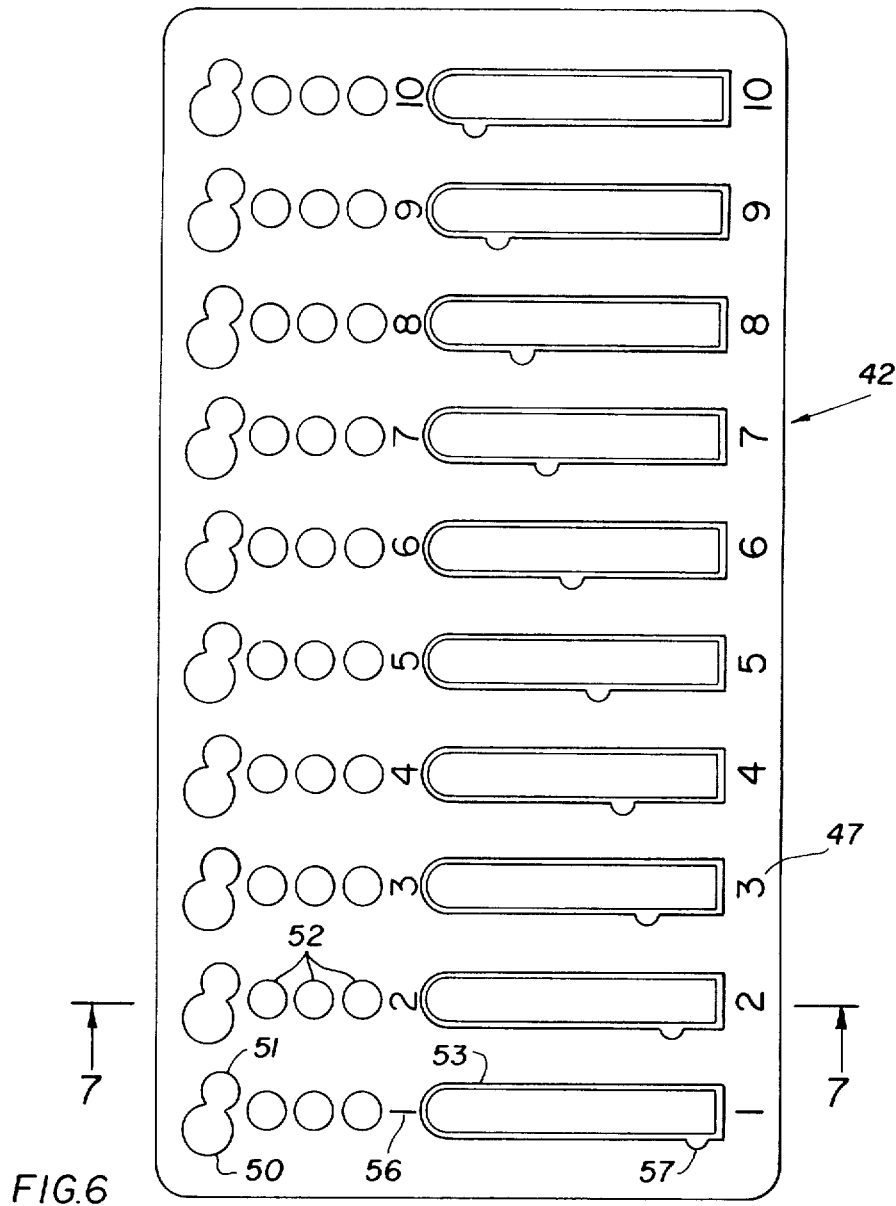
FIG. 6 is a top plan view of a test tube rack according to the present invention.
Figure 7:
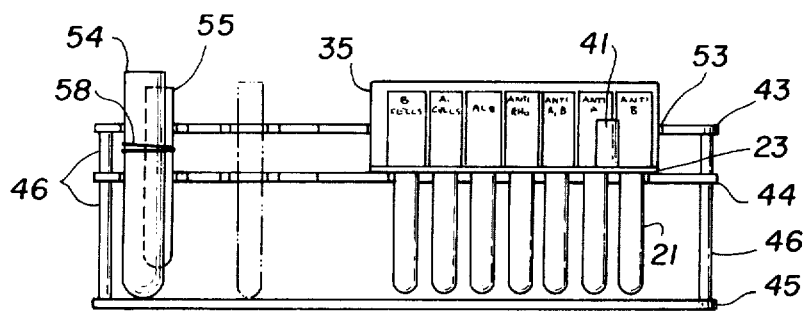
FIG. 7 is a sectional view taken along line 7—7 of FIG. 6 and showing a test tube unit and carrier in place in the rack.
Figure 8:
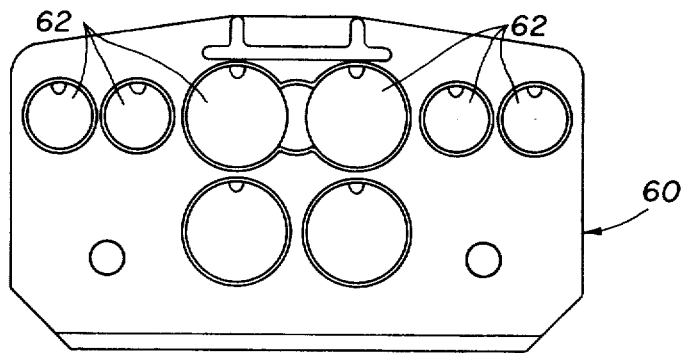
FIG. 8 is a top plan view of a centrifuge receiver for a test tube unit.
Figure 9:
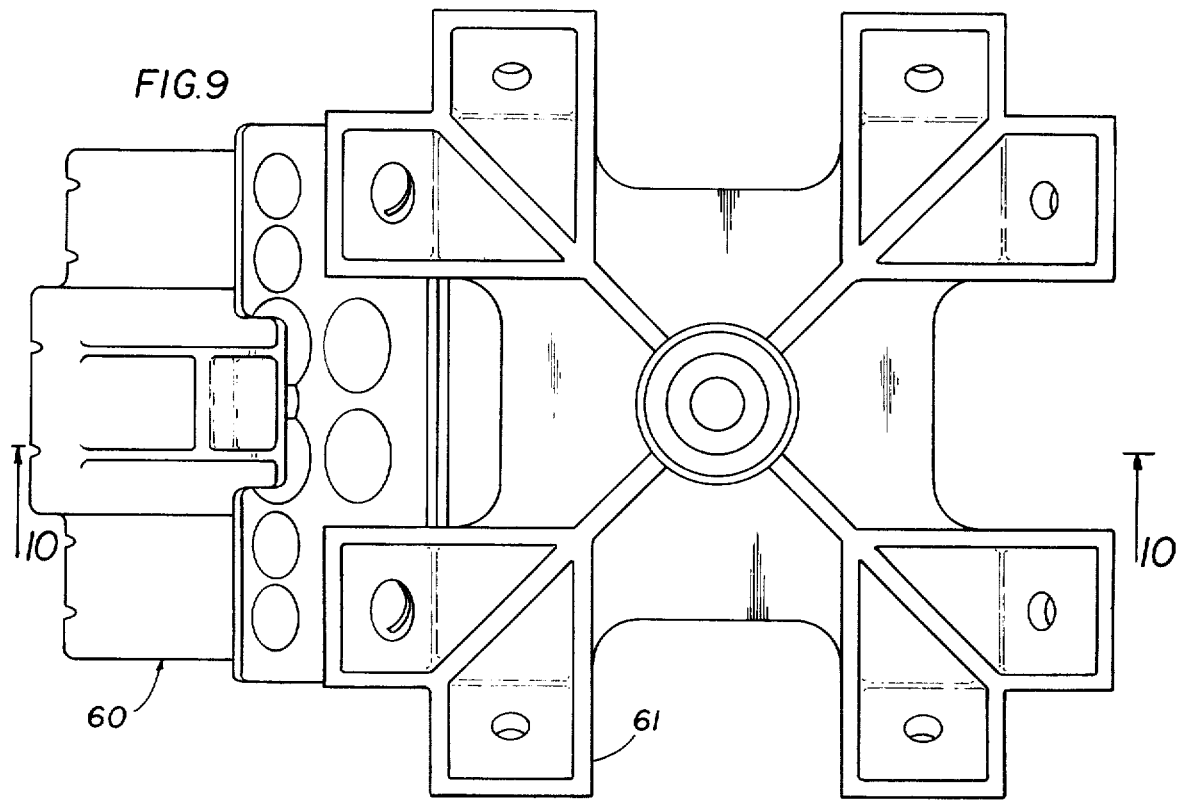
FIG. 9 is a top plan view of a centrifuge rotor hub showing one receiver for a test tube unit in place on the hub.
Figure 10:
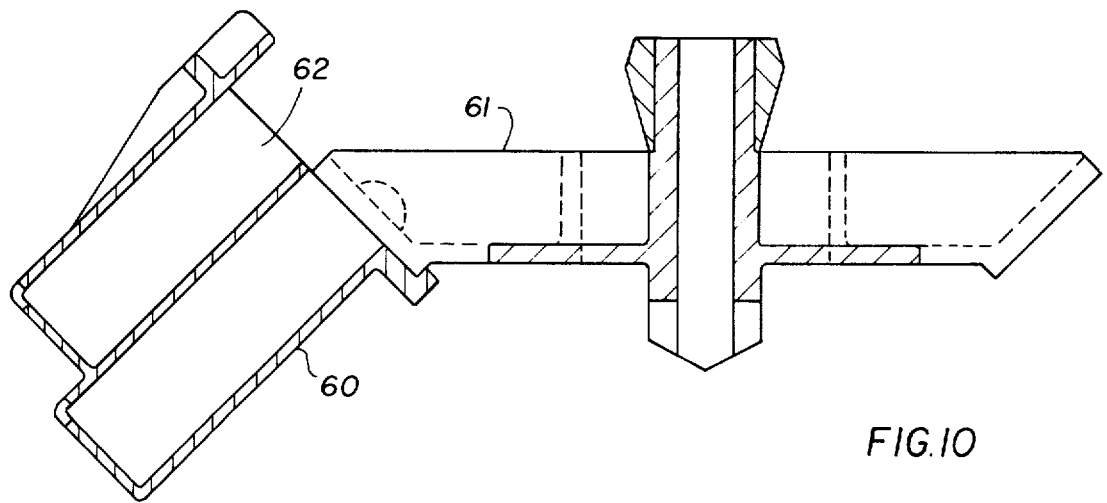
FIG. 10 is a fragmentary view, partly in section, taken along line 10—10 of FIG. 9.

Attention is now directed to FIGS. 6 and 7 of the drawing for a description of the test rack 42 preferred for use with the unit 20 and carrier 35 of the invention. Rack 42 is seen to comprise three spaced apart plates 43, 44, and 45 which are supported in their spaced apart relationship by corner posts 46. Plates 43, 44, and 45 are sufficiently rigid that rack 42 will not sag in the middle, but if additional support is desired, additional posts (not shown) could be provided at other parts of the structure. The posts 46, and others if provided, and plates 43, 44, and 45 may be secured together by screws or by any suitable fastening.

Bottom plate 45 is simply a rectangular member without openings or apertures, except if provided for screws to enable its attachment to corner post 46. Middle plate 44 and top plate 43 are similar in that they are each provided with the same cut-outs for individual test tubes and other cut-outs for the test tube unit 20 and carrier 35. The cut-out for test tube unit 20 will be slightly smaller in plate 44 than in plate 43 for a reason that will be mentioned hereinafter. Middle plate 44 is not provided with numeral markings as is top plate 43 since they would serve no purpose on the middle plate. These markings or indicia 47 indicate the various test stations provided on the test rack 42.

Referring now to FIG. 6 especially, the various apertures in top plate 43 will be described. As noted above, so far as apertures or openings are concerned, middle plate 44 is similar to plate 43. It does not, however, have key slots even if such slots are provided on plate 43. Starting from the top of the plate (in the drawing) but what would be the back of the plate when rack 42 is in use on a laboratory table, there are a pair of intersecting apertures 50 and 51. The larger aperture 50 will hold a larger test tube that will contain a saline suspension of a person's red blood cells and the other aperture 51 will hold a smaller test tube containing the person's blood serum or plasma. These are the blood components used in the usual blood typing tests, but for other tests, whole blood may be used and only one of the apertures 50 or 51 will hold a sample containing test tube. Next in line are a series of individual apertures 52 for holding individual test tubes, three have been illustrated but more or less could be provided. They may be used for holding test tubes that will be used for performing tests other than blood typing tests or in carrying out other laboratory procedures.

There then comes the elongated opening 53. This opening is shown to be round at the rear end and rectangular at the front end. Opening 53 accommodates a test tube unit 20 and its carrier 35. It will be remembered that unit 20, or more particularly its ledge 23, and carrier 35 likewise were formed with one round and one rectangular end. Therefore, unit 20 and carrier 35 can only be placed in opening 53 with one orientation and, as noted above, unit 20 can only be placed in carrier 35 with one orientation. This is important since in blood typing certain of the test tubes in unit 20 will receive a sample of the suspension of red cells from the test tube 54 placed in aperture 50 and other test tubes in unit 20 will receive a sample of serum from the test tube 55 placed in aperture 51. The test tubes of unit 20 are filled with the blood component samples only after unit 20 is placed in carrier 35 and the technician would rely on the legends marked on carrier 35 to inform him which samples to place in each test tube as well as which reagent to mix with each sample. For example, if the carrier legend is "A Cells" to indicate that a reagent having A antigen red cells is to be put in that test tube, then that test tube must contain a sample of serum because a cell reagent is mixed with a serum sample. On the other hand, if the legend is, for example, Anti A, this means that the reagent to be put in that test tube contains antibodies for the A antigen, and that test tube must contain a red cell sample. Immediately in front of opening 53 is the numeral marking 47 indicating the number of the test station, that is, the row of aligned openings just described. A corresponding numeral marking 56 may be placed just in front of the sample tube apertures 50 and 51. The markings will change from test station to test station, and generally will be in numerals, although alphabetical markings may be used, so long as the markings correspond to the markings provided on the front end 36 of carrier 35. The arrangement is such that when a carrier 35 and its associated test tube unit 20 containing samples and reagents is removed from test rack 42 for centrifugation, the carrier 35 and unit 20 will be returned to the test station from which they were removed. This is important since a test station will be associated with a particular person, the person whose blood samples are in the test tubes held in apertures 50 and 51.

As noted earlier, as a further safeguard to prevent misplacing unit 20 and carrier 35, opening 53 could be provided with a key slot 57. The slots 57 in adjacent openings 53 would progressively move back away from the front of opening 53 as the test stations change. The key slots could also be located on both sides of opening 53 if so desired. A similar relocation of the key 41 on carrier 35 would take place so that only a carrier with a properly located key could be inserted in a test station. Such a keying arrangement is probably superfluous since reliance can be had by matching the markings 39 on carrier 35 to the markings 47 on test rack 42.

In use, samples of blood components from a number of persons would be prepared and properly identified. These samples would be placed in test tubes which in turn would be placed in the apertures 50 and 51 of test rack 42. Each person's samples would be placed in a test station and the number of that test station would be entered in a log book alongside the person's name or identification number. Next a carrier 35 bearing a numerical marking corresponding to that of the test station would be snapped over a test tube unit 20, and the carrier 35 and unit 20 slipped into an opening 53 for the correspondingly numbered test station. It will be assumed that only blood typing tests are being performed so there is no need to place test tubes in additional apertures 52. Now serum from the serum test tube 55 in aperture 51 is pipetted into the test tubes of unit 20 that are later to receive the red cell reagents. Similarly a suspension of red cells is pipetted from the red cell containing test tube 54 in aperture 50 into those test tubes of unit 20 that are to receive reagents containing antibodies.

After test tubes 21 have received the proper samples and the designated reagents, the carrier 35 and test tube unit 20 are removed from test rack 42 and placed in the special receptacle 60 mounted on centrifuge hub 61. Unit 20 and carrier 35 simply slip into the cavity 62 which is formed to accept them as a unit. After centrifugation, the contents of test tubes 21 are observed to determine whether or not agglutination has taken place in any tube. It is recognized that if the various test tubes with samples and reagents were handled individually, they would not all require centrifugation. However, centrifugation does not adversely affect the results if those samples and reagents are centrifuged so there is no harm done when all samples and reagents in unit 20 are centrifuged. With seven test tubes 21 provided in unit 20, both forward and reverse checking of blood types can be done at one time, as well as testing for the Rh antigen. After observation for agglutination, a carrier and its associated unit 20 is returned to its proper station in test rack 42 as determined by the numerical mark on the carrier and on the test rack. The test results are entered in the log book adjacent the test station number and the person's identification number. It is not believed necessary to go into details on the blood type group determination from the results of the tests performed since this is well known to those having skill in the art and it is not a part of this invention. After the tests are completed and the blood type group determination made, the various test tubes used and their contents are discarded. Test tube unit 20 is separated from carrier 35 and unit 20 also is discarded. Carrier 35 is then placed in rack 42 where it is supported on middle plate 44 until it is again to be used for other tests. Since the opening in plate 44 is slightly smaller than the corresponding opening in top plate 43, as hereinabove specified, carrier 35 will fit through opening 53 in top plate 43 but will rest on middle plate 44.

Having thus described the invention it is clear that what may appear to be different embodiments thereof could be provided without departing from the spirit and scope of the invention. Hence it is intended that the foregoing specification and the drawing be interpreted as illustrative rather than in a limiting sense.

What is claimed is:

1. In a testing apparatus for determining the blood group of a patient's blood, the combination of a plurality of separate test tube like elements each being capable of holding a liquid sample, said elements being linearly arranged and joined together to form a single unitary multiple receptacle member having separate chambers for directly receiving blood component samples to be tested, and a thin walled, flattened tubular indicia member having two parallel sidewalls joined by end walls and open at top and bottom and adapted to surround the upper portion of said multiple receptacle member, said indicia member being further adapted to be removably attached to said multiple receptacle member to form an integral test unit, said indicia member having a depth from top to bottom sufficient to be marked adjacent each test tube like element with a legend indicative of the reagent to be added to that element in conducting a blood group test, whereby after a test is completed the test unit can be readily separated and the multiple receptacle member discarded while said indicia member is available for use on another multiple receptacle member.

2. The combination according to claim 1 wherein said multiple receptacle member, is a disposable integrally molded unit.

3. The combination according to claim 1 wherein the indicia member markings are in the form of labels that are adhered to said indicia member.

4. The combination according to claim 1 wherein said multiple receptacle member includes a ledge like element surrounding said member against which said indicia member abuts and which limits the relative positions of said receptacle and indicia members.

5. The combination according to claim 4 wherein said indicia member fits around the top part of said receptacle member and is dimensioned such that when in abutting relationship with the ledge like element of said receptacle member the tops of the sample chambers of said receptacle member are substantially aligned with the top of said indicia member.

6. The combination according to claim 1 wherein said indicia member is frictionally joined to said receptacle member.

7. The combination according to claim 1 including a rack means having an upper surface with an elongated opening through which the lower part of the integral test unit projects but which rack means supports the integral test unit with the legends on said indicia member being visible above the upper surface of said rack means.

8. The combination according to claim 4, including rack means comprising two elements spaced one above the other, the topmost element having an opening through which said receptacle member and said indicia member fit, and the lower element having an opening through which the lower part of said receptacle member projects but which supports the ledge like element of said receptacle member.

9. The combination according to claim 7 wherein the upper surface of said rack means is provided with a plurality of additional elongated openings arranged in side by side relationship to form test stations, said upper surface being marked adjacent each opening with an indicia to identify the test station formed by the opening, and including additional indicia members for each test station, each indicia member being given an identifying indicia to correspond with the identifying indicia of an associated test station.

10. The combination according to claim 9 wherein each test station opening is shaped differently at each of its ends, and each indicia member has corresponding shapes at its ends, whereby an indicia member can be placed in said opening with one orientation only.

11. The combination according to claim 1 including cooperating means on said multiple receptacle member and on said indicia member which permit said indicia member to be attached to said receptacle member with only one orientation.

12. The combination according to claim 11 wherein said cooperating means include rib means on said receptacle member and complimentary rib means on said indicia member that interfere with said rib means on said receptacle member when said indicia member is attempted to be placed on said receptacle member in a reversed direction.

* * * * *